United States Patent [19]
Stoffer et al.

[11] 3,742,065
[45] June 26, 1973

[54] PROCESS FOR FORMING DIETHYLSULFIDE OR DIPROPYLSULFIDE

[75] Inventors: Robert L. Stoffer, Naperville, Ill.; Thomas D. Nevitt, Valparaiso, Ind.

[73] Assignee: Standard Oil Company, Chicago, Ill.

[22] Filed: Nov. 2, 1970

[21] Appl. No.: 86,352

Related U.S. Application Data

[63] Continuation-in-part of Ser. No. 767,499, Oct. 14, 1968, abandoned.

[52] U.S. Cl. .............................. 260/609 R, 208/189
[51] Int. Cl. ......................................... C07c 149/00
[58] Field of Search ................................. 260/609 R

[56] References Cited
UNITED STATES PATENTS
3,542,891  11/1970  Schmerling ................. 260/609 R X Primary Examiner—Lewis Gotts
Assistant Examiner—D. R. Phillips
Attorney—Wolfe, Hubbard, Leydig, Voit and Osann

[57] ABSTRACT

A process for forming diethylsulfide or dipropylsulfide, which process may be employed to desulfurize various refinery streams such as distillate fuel bases, comprising reacting an olefin selected from the group consisting of ethylene and propylene with a sulfide reactant containing a dialkylsulfide wherein each alkyl group contains at least two carbon atoms in the presence of a catalyst selected from the group consisting of silica-alumina and alumina at a temperature in the range of from about 450°F. to about 600°F. and a pressure of from about 15 p.s.i.g. to about 500 p.s.i.g.

9 Claims, No Drawings

PROCESS FOR FORMING DIETHYLSULFIDE OR DIPROPYLSULFIDE

This is a continuation-in-part of Ser. No. 767,499, filed Oct. 14, 1968, now abandoned.

This invention relates to the formation of sulfides and, more particularly, to a process for forming diethylsulfide or dipropylsulfide.

These sulfides, particularly diethylsulfide, find considerable use as intermediates. Thus, diethylsulfide may be oxidized to diethylsulfoxide which may be advantageously employed to enhance the ignition characteristics of diesel fuel. Diethylsulfoxide may also be utilized as a solvent and dispersing agent for various polymeric materials, cellulose esters, lignin and carbohydrates.

Additionally, diethylsulfide may be converted into ethyl mercaptan, which itself serves as an intermediate for the manufacture of various insecticides and plastics. The ethyl mercaptan may also be converted into diethyldisulfide, which is, in turn, converted to disulfoxides that find use as degradable detergents.

Despite these many applications, there is no economical process available for forming these compounds. It is accordingly an object of the present invention to provide a simple and economical method for forming diethylsulfide and dipropylsulfide.

Other objects and advantages of the invention will become apparent as the following description proceeds.

In accordance with the present invention, there is provided a process for forming diethylsulfide or dipropylsulfide which comprises reacting ethylene (to form diethylsulfide) or propylene (to form dipropylsulfide) with a dialkylsulfide wherein each alkyl group contains at least two carbon atoms in the presence of a catalyst selected from the group consisting of silica-alumina and alumina at a temperature in the range of from about 450°F. to 600°F. and a pressure of from about 15 p.s.i.g. to about 500 p.s.i.g. It is preferred to employ a sulfide reactant having a boiling point in the range of from about 200°F. to about 600°F.

In carrying out the reaction, the olefin used is first desirably blended with the sulfide reactant, placed under pressure and the blended mixture then passed through the catalyst. The diethylsulfide or dipropylsulfide which is formed may be easily separated by fractionation.

To serve as the sulfide reactant, a single sulfide can be employed. Thus, as representative examples, dibutylsulfide or dioctyl sulfide may be employed. The reactant may also suitably comprise a mixture of various dialkylsulfides (each alkyl group, of course, having at least two carbon atoms) ranging from a highly concentrated mixture to a feedstock containing only a minor amount (e.g., — less than about 2 or 3 percent by weight) of such dialkylsulfides. In this latter instance, a refinery stream such as a distillate fuel base can be advantageously employed. Other refinery streams that may be used include light virgin gas oil, kerosene and diesel fuels. The prime requirement for the refinery stream is that it contain at least one dialkylsulfide as hereinbefore described. Generally, refinery streams such as have been enumerated will contain a plurality of such dialkylsulfides as well as other sulfur-containing compounds.

The sulfide reactant should have a boiling point of at least about 200°F., which corresponds generally with the boiling point of diethylsulfide (i.e., — b.p. of about 198°F.). In addition, it is preferred to employ sulfide reactants having a boiling point of no more than about 600°F. While sulfide reactants with boiling points above 600°F. could be employed, volatility under the process conditions decreases with increases in the boiling point and a concomitant decrease in conversion of the reactant to the final product results. In short, the practicality of the process decreases rapidly as the boiling point of the sulfide reactant increases above about 600°F.

It should be similarly appreciated that, while the sulfide reactant may desirably include alkyl groups having the same number of carbon atoms, dialkylsulfides wherein both groups do not have the same number of carbon atoms may also be utilized. Also, an organic solvent such as decane may be employed for the sulfide reactant to serve as a diluent to reduce the sulfide content to a desired level. The solvent should, of course, volatilize under the process conditions.

As can be seen from the description of the sulfide reactant, ethylene could be reacted with diethylsulfide and propylene could be reacted with dipropylsulfide. While these reactions will theoretically proceed (at least partially) with the ethylene or propylene displacing the corresponding alkyl group in the sulfide reactant, such reactions will obviously find little commercial practicability.

In applications where a refinery stream is used as a feedstock in forming the dialkylsulfides, the process of the present invention may at the same time serve as an alternative to conventional hydrogen desulfurization.

The olefin employed is either ethylene or propylene. Higher conversions are achieved when ethylene is used; and accordingly, ethylene is preferred when the process of the present invention is utilized for desulfurization of refinery streams. An economical source for the ethylene and propylene are the gas streams resulting from the catalytic cracking of petroleum. Typically, these gas streams may be employed without any necessity for removing the normal impurities found in such streams, i.e., hydrogen, methane, ethane and propane. Indeed, solvents for the olefin reactant can be used to provide any desired concentration.

The relative amounts of the reactants employed can be widely varied. For most applications, considering only the sulfur present in the sulfide reactant as dialkylsulfides having a boiling point of at least 200°F., there should be present from about 0.01 to about 0.5 mole sulfur per mole olefin.

Suitable catalysts include those silica-alumina and alumina materials that have been heretofore employed as catalytic cracking catalysts and catalysts supports for hydroforming processes. Representative examples of suitable silica-alumina catalysts include silica-alumina (25 percent alumina) and silica-alumina (13 percent alumina).

The space velocity of the sulfide may be varied within wide limits. Generally, the space velocity, based upon parts by weight of the sulfide reactant per part catalyst per hour, may vary from about one to about 20. At the lower velocities, a more complete reaction will be achieved while the higher space velocities will usually provide greater economy through increased throughput.

As hereinbefore set forth, the temperatures for carrying out the reaction may be between about 450°F. and 600°F. with the pressures being maintained from about 15 to 500 p.s.i.g. The effect of changes in the temperature on the reaction is considerably more significant than changes in the pressure. Maintaining the reaction temperature at the upper part of the range, i.e., — 550°F. to 600°F., will allow the use of lower pressures to achieve a particular conversion; and similarly, the higher pressures will decrease the temperature needed to reach a predetermined conversion. It is, however, preferred to maintain the temperature at about 550°F. to about 600°F. and the pressure at at least about 385 p.s.i.g.

The hereinbefore described method of forming diethylsulfide or dipropylsulfide may be readily understood from the following examples, which are illustrative of how the present invention could be carried out. The examples are not intended as limiting the scope of the present invention. Unless otherwise indicated, all parts are by weight. The "reactant weight ratio" is the ratio of the weight of the material containing organic sulfides to the olefin. The "space velocity" is defined as the parts by weight of the sulfide reactant per part catalyst per hour. The "conversion" represents the percentage of the sulfur present in the reactant as organic sulfides which is converted to products, mainly diethylsulfide or dipropylsulfide (depending upon whether the olefin reactant is ethylene or propylene) and is determined by gas chromatography.

EXAMPLE 1

Pure ethylene and a solution of dibutylsulfide in decane (1 percent sulfur) are employed as the reactants. A small flow reactor is utilized. A glass wool plug is placed in the reactor and 1 gram of catalyst is placed thereon. Atop the catalyst is positioned "HELI-PAK 3102" stainless steel column packing (Podbielniak, Inc., Franklin Park, Ill.) to within about 1 inch of the top of the reactor. A glass wool plug is inserted on the inert packing.

The ethylene is mixed with the sulfide reactant by combining the two streams before reaching the catalyst zone and is passed through the catalyst bed. After steady state conditions are reached, the conversion of the sulfide reactant is measured. The reaction is carried out with the temperature and catalysts being varied.

The properties of the catalysts (each being from 20–40 mesh in size) are as follows:

- silica-alumina (13 percent alumina) - conventional cracking catalyst having as impurities - sodium oxide (0.01 percent), iron (0.03 percent), sulfate (0.8–1.0) with a surface area of 600 sq. meters/gram and a pore volume of 0.7 ml./gram
- alumina (large pore diameter) - gamma alumina with a surface area of 350 sq. meters/grams, a pore volume of 0.65 ml./gm. and an average pore diameter of 112 angstroms
- alumina (high purity) - gamma alumina with a surface area of 240 sq. meters/gm., a pore volume of 0.5 ml./gm. and an average pore diameter of 88 angstroms.

The reaction conditions are set forth in Table 1:

TABLE 1

| | |
|---|---|
| Space velocity | 5 |
| Reactant weight ratio | about 5 |
| Pressure | 15 p.s.i.g. |

The conversions of dibutylsulfide to products, including diethylsulfide, are shown in Table 2:

TABLE 2

| Catalyst | Temperature 500°F. | 550°F. |
|---|---|---|
| Silica-alumina (13% alumina) | 36 | 86 |
| Alumina (large pore diameter) | 43 | 79 |
| Alumina (high purity) | 57 | 100 |

EXAMPLE 2

Pure ethylene and a distillate fuel base, having a sulfur content of 0.36 percent present as organic sulfides, are employed as the reactants. The distillate fuel base has the following characteristics: (1) under simulated distillation, 10 percent by volume of the oil boils below 346°F. and 90 percent by volume boils below 583°F., the end point of the distillation being slightly above about 600°F., i.e., — 610°F., (2) a specific gravity at 73°F, of 0.81, and (3) an analysis of 80.0 percent paraffins, 1.0 percent olefins and 19.0 percent aromatics.

The reactor described in Example 1 is employed. The catalyst is 1 gram of a silica-alumina catalyst (25 percent alumina) which is a conventional cracking catalyst of 20 to 40 mesh size having the same impurities as the 13 percent alumina catalyst set forth in Example 1 and with a surface area of 540 square meters/gm. and a pore volume of 0.75–0.87 ml./gm., with the reactant weight ratio being 5, the temperature being maintained at about 600°F. and the pressure being about 420 p.s.i.g.

As in Example 1, the ethylene is mixed with the distillate fuel base by combining the two streams before reaching the catalyst zone and is passed through the catalyst at a space velocity rate of 5. After steady state conditions are reached, a conversion to diethylsulfide of 90 percent is obtained.

EXAMPLE 3

Example 1 is repeated with a silica-alumina (13 percent alumina) catalyst and the temperatures and pressures being varied. The data, after steady state conditions are reached, are set forth in Table 3:

TABLE 3

| Temperature | Pressure, p.s.i.g. | Conversion |
|---|---|---|
| 500 | 15 | 36 |
| 550 | 15 | 86 |
| 500 | 200 | 75 |

EXAMPLE 4

Example 1 is repeated at 500°F. and 15 p.s.i.g. with a 30 percent ethylene stream in methane and a silica-alumina (13 percent alumina) catalyst being employed. A reactant weight ratio of 8 is used and a conversion of 29 percent is obtained.

EXAMPLE 5

Example 1 is repeated, except with dioctylsulfide serving as the sulfide reactant. The conversion to diethylsulfide is measured and results similar to Example 1 are achieved.

EXAMPLE 6

Example 1 is repeated, except with butyldodecylsulfide being the sulfide reactant. The conversion to diethylsulfide is measured and results similar to Example 1 are achieved.

EXAMPLE 7

Example 1 is repated at 500°F. and 140 p.s.i.g. with propylene being substituted for ethylene and with a silica-alumina (25 percent alumina) catalyst. A conversion of 20 percent is achieved.

EXAMPLE 8

Example 7 is repeated, except with diethylsulfide being used as the sulfide reactant. The conversion to dipropylsulfide is measured and results similar to Example 7 are achieved.

EXAMPLE 9

Example 7 is repeated, except with dioctylsulfide serving as the sulfide reactant. The conversion to dipropylsulfide is measured and results similar to Example 7 are achieved.

EXAMPLE 10

Example 7 is repeated, except with butyldodecylsulfide being the sulfide reactant. The conversion to dipropylsulfide is measured and results similar to Example 7 are achieved.

Thus, as has been seen, the present invention provides a simple and economical process for forming diethylsulfide and dipropylsulfide. If desired, the sulfide-containing reactant may be a refinery stream, such as a distallate fuel base; and, in this instance, the subject invention may serve, in part, as a substitute for conventional hydrodesulfization since products easily removed by distillation are formed from substantially all the sulfur content present as organic dialkylsulfides with boiling points of about 200°F. or more.

While the invention has been described in connection with certain preferred embodiments, it is to be understood that this invention is not intended to be limited to the particular embodiments disclosed, but, on the contrary, it is intended to cover the various modifications and equivalents included within the spirit and scope of the invention as defined in the appended claims.

We claim as our invention:

1. A process for forming diethylsulfide or dipropylsulfide which comprises reacting an olefin selected from the group consisting of ethylene and propylene with a sulfide reactant containing a dialkylsulfide wherein each alkyl group contains at least 2 carbon atoms in the presence of a catalyst selected from the group consisting of silica-alumina and alumina at a temperature in the range of from about 450°F. to about 600°F. and a pressure of from about 15 p.s.i.g. to about 500 p.s.i.g.

2. The process of claim 1 wherein the olefin is ethylene.

3. The process of claim 1 wherein the olefin is propylene.

4. The process of claim 1 wherein the sulfide reactant is a mixture of said dialkylsulfides.

5. The process of claim 1 wherein the sulfide reactant is a refinery stream having a boiling point of at least about 200°F.

6. The process of claim 1 wherein the catalyst is alumina.

7. The process of claim 1 wherein the catalyst is silica-alumina.

8. The process of claim 1 wherein the temperature is maintained at from about 550°F. to about 600°F. and the pressure is maintained at least about 385 p.s.i.g.

9. A process for forming diethylsulfide or dipropylsulfide which comprises reacting an olefin selected from the group consisting of ethylene and propyelen with a reactant containing a dialkylsulfide and having a boiling point of from about 200°F. to about 600°F. in the presence of a catalyst selected from the group consisting of silica-alumina and alumina at a temperature in the range of from about 450°F. to about 600°F. and a pressure of from about 15 p.s.i.g. to about 500 p.s.i.g.

* * * * *